United States Patent
Nakamura et al.

(10) Patent No.: US 6,933,487 B2
(45) Date of Patent: Aug. 23, 2005

(54) IMAGE READER AND IMAGE PROCESSOR HAVING A LIGHT SOURCE FORMING TRAPEZOID-SHAPED ILLUMINANCE DISTRIBUTION IN SUB-SCANNING DIRECTION

(75) Inventors: Tetsuroh Nakamura, Takaraduka (JP); Masaichiro Tatekawa, Minoo (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 320 days.

(21) Appl. No.: 10/088,112

(22) PCT Filed: Jul. 18, 2001

(86) PCT No.: PCT/JP01/06259

§ 371 (c)(1),
(2), (4) Date: Mar. 15, 2002

(87) PCT Pub. No.: WO02/07427

PCT Pub. Date: Jan. 24, 2002

(65) Prior Publication Data

US 2002/0148951 A1 Oct. 17, 2002

(30) Foreign Application Priority Data

Jul. 18, 2000 (JP) .......................................... 2000-217561
Jul. 25, 2000 (JP) .......................................... 2000-224156

(51) Int. Cl.$^7$ ........................... H01L 27/00; H04N 1/46; G02B 27/02
(52) U.S. Cl. ..................... 250/208.1; 250/216; 358/509; 359/738; 359/800
(58) Field of Search ............................... 250/208.1, 216; 359/451, 457, 738, 798, 800; 358/474, 475, 483

(56) References Cited

U.S. PATENT DOCUMENTS

| 5,446,290 | A | | 8/1995 | Fujieda et al. |
| 5,521,725 | A | * | 5/1996 | Beeson et al. ................. 349/95 |
| 5,617,131 | A | * | 4/1997 | Murano et al. ............. 347/233 |
| 5,926,286 | A | | 7/1999 | Fujieda |

FOREIGN PATENT DOCUMENTS

| EP | 0596664 | 5/1994 |
| JP | 05-303058 | 11/1993 |

(Continued)

*Primary Examiner*—Stephone B. Allen
(74) *Attorney, Agent, or Firm*—McDermott Will & Emery LLP

(57) ABSTRACT

An image reader for reading an image drawn on a paper or a sheet-like recording medium, an image processor provided with the image reader, such as a copying machine, a scanner and the like, and a fiber lens to be applied to those devices. The image processor has to be large in the whole size of device to read both sides of an original. Therefore, the image processor of the present invention comprises an image reader (10*a*) on the upper side of transport path and an image reader (10*b*) on the lower side of that respectively. In order to downsize the device, it is necessary to shorten the diameter of optical fiber (140) of the fiber lens (14) installed in the imager reader as light receiving means. In this case, the optical fiber (140) is provided with a light-absorbing layer 8 (143) around of the optical fiber (140) in order to restrain the crosstalk and the flare phenomenon. The illuminance of light source means (15) installed in the image reader gets smaller as the device is downsized. In case where the illuminance is small, the image quality is deteriorated by the floating of the original. Accordingly, the image reader should be provided with the light source means so as to uniform the illuminance over a specific width of the main and sub scanning directions. Therefore, it is possible to avoid the deterioration of the image quality.

11 Claims, 19 Drawing Sheets

FOREIGN PATENT DOCUMENTS

| | | |
|---|---|---|
| JP | 85563 | 12/1994 |
| JP | 08-018729 | 1/1996 |
| JP | 08-051513 | 2/1996 |
| JP | 09-037039 | 2/1997 |
| JP | 09-046484 | 2/1997 |
| JP | 10-304147 | 11/1998 |
| JP | 10-308860 | 11/1998 |
| JP | 2000-035519 | 2/2000 |

* cited by examiner

IMAGE READER AND IMAGE PROCESSOR HAVING A LIGHT SOURCE FORMING TRAPEZOID-SHAPED ILLUMINANCE DISTRIBUTION IN SUB-SCANNING DIRECTION

TECHNICAL FIELD

The invention relates to an image reader for reading images drawn on a paper or a sheet-like recording medium, a fiber lens, the method of manufacturing the fiber lens, and an image processor provided with the image reader.

BACKGROUND ART

The image processor is represented as the multi-functional printer combining respective functions of a copying machine, a scanner, a printer, and a facsimile, or respective functions of a facsimile and a copying machine and a printer. Such image processor comprises an image reader for reading images such as shapes and positions of characters and graphic patterns drawn on a paper or a sheet-like recording medium (which is called an original hereafter).

FIG. 15 shows an example of the image reader applied to the copying machine.

First, an original 117 placed on an original tray 118 comprising an original carrier 101 is drawn into a machine casing by a picking roller 119, and then fed to a read station 106 by an upper and lower feeding rollers 102a and 102b. The original 117 fed to the read station 106 in this way is carried forwarder by a belt roller 103 placed on the upper side of a transport path 114 of the original.

At a reading position P of the read station 106, the images drawn on one side of the original 117 is read out. After completing the reading, the belt roller 103 carries the original 117 from the read station 106 to a reversing roller 104. After the reversing roller 104 makes the original 117 turn over, the original 117 is carried to the read station 106 again by the belt roller 103 of which the rotation direction is reversed. The read station 106 reads the images drawn on the other side of the original 117, and then the original is discharged outside of the copying machine.

The read station 106 is provided with an image reader in which the original 117 is irradiated with the light from a light source 112 like a fluorescent light at the reading position P, and then the reflected light is guided to a lens 109 through a mirror 113 and is focused on a sensor 108 like CCD.

Though in the above description the light source without moving itself is to read the original 117 moving in the transport path 114, there is an other configuration: the glass original table (not shown in the drawing) is provided at the position below the transport path 114, and the original placed on this original table is read out by moving the light source 112 (the reading position P as well as the light source 112). Such configuration is available for obtaining image data from the original that cannot be inserted into the original tray 118, such as a book, for example.

FIG. 16 is a diagram showing an example of related arts of the image reader different from the above-mentioned one. As shown in FIG. 16, the image reader is a contact type image reader comprising light receiving means 126 provided with a lens using a rod lens array 121 and a sensor 108 using CCD or the like, in addition to the light source 112 of LED array and etc.

The LED array used as the light source 112 is configured by disposing a plurality of LED element 125 at specific intervals on one side of a basal plate 124 as shown in FIG. 17, for example.

On the light source 112, the each LED array is placed symmetrically so that the illuminance of the light of the LED array may reach the peak at the reading position P of the original 117.

The rod lens array 121 is placed above the reading position P of the original 117. The rod lens array 121 is configured as shown in FIG. 18: a specific number of rod lenses 122, which is in a specific length and in a cylindrical shape of a specific diameter, may be disposed in a plurality of line so as to adjoin to each other. And such configured rod lens 122 is put between basal plates 124 through a black resin used as a light-absorbing layer 123 for removing the light noises of the crosstalk and the flared light.

At this time, as the angular aperture that is an angle between the central axis of the rod lens 122 and the light incident on the rod lens 122 gets smaller, the focal depth of the incident light becomes deeper. When the focal depth becomes deep, it is possible to obtain a clear picture within a specific area from the focus of the rod lens 122 as much as the one at the focus position. It is equivalent to the improvement of the image quality. In other words, in order to improve the image quality, it is necessary to narrow the angular aperture. To achieve this object, the rod lens 122 may be small in the outside diameter of circle.

The crosstalk is a phenomenon that in case where the reflected light on the original 117 is incident to the central axis of the rod lens 122 of the rod lens array 121 over specific angles, the reflected light is not reflected on the side surface of the cylinder of the rod lens 122 but penetrates into the other adjacent rod lens. Accordingly, the reflected light does not converge on a position to be converged, but is detected as the noises by the sensor 108.

The flared light is the irregular reflection of light on the original 171, and the phenomenon exerts the bad influence upon the positions other than that to be converged. It is also detected as the noises by the sensor 108.

The sensor 108 is CCD, CMOS (Complementary Metal Oxide Semiconductor), or the like, for example. It is needless to say that it is placed on the opposite side to the original of the rod lens array 121.

One of the demerits of the conventional image processor like the above copying machine is that the device becomes big in size because the copying machine must be provided with the reversing roller 104 due to reading the original 117 per one side. In addition, there are other demerits that the rotation direction of the belt roller 103 must be controlled so as to reverse the rotation direction corresponding to the reading surface of the original 117 and it takes long time for the reading.

If the contact type of image reader is adopted, it is possible to downsize the image processor further more than a case of adopting the image reader using the mirror and lens. Even in the contact type of image reader, the optical path length requires approximately 50 mm by adopting the rod lens 122 in 0.6 mm diameter.

The diameter of the rod lens 122 used for the light receiving means 126 may be small in order to shorten the focal length (shorten the optical path length) of the contact type of image reader. However, the smaller the diameter of the rod lens 122 becomes, the more conspicuous the crosstalk and the flare phenomenon becomes. It makes impossible to obtain clear images.

FIGS. 19A and 19B are graphs showing the distribution of the illuminance of the conventional image reader provided with the LED array as the light source 112. In case where the reading direction is the sub scanning direction as described previously, if the illuminance is distributed around the irradiated position so as to form a peaked shape, the distribution of the illuminance on the original 117 when it is positioned at the reading position P can be shown as in FIG. 19A. On the other hand, under a state where the original 117 shifts in the direction away from the light source 112 at the reading position P, the distribution of illuminance is shown in FIG. 19B.

That is to say, the position away from the peak of the distribution of illuminance becomes the reading position P, accordingly while keeping the illuminance small the reading is performed. In case where the fluorescent light is used as the light source 112 as described above, the light intensity is strong originally. And the illumination width is wide, so that the influence on the image quality at the copying is less even when the original shifts more or less. However, in order to downsize the image reader, LED and the electronic luminescence used as the light source has a comparative small light intensity, and the light with narrow illumination width must be used.

If the device works on the basis of the above-mentioned distribution of illuminance in this case, it is not possible to obtain the sufficient image quality.

It is noted that when the image reader reads the images drawn on the original 117, the direction that the original is read at a time at the reading position P is the main scanning direction, the direction that the original is read one after another corresponding to the carrying direction of the original is the sub-scanning direction.

The invention is proposed considering the above-mentioned conditions, and has an object to provide the image processor capable of downsizing the image reader, shortening the time for reading the images drawn on the both sides of the original, and avoiding the deterioration of image quality accompanying with the downsizing, the image reader and the fiber lens thereof, and the method of manufacturing the fiber lens.

DISCLOSURE OF INVENTION

In order to achieve the above object, the invention comprises image readers provided on both the upper and lower sides of the transport path of the original for reading images drawn on the both sides of the original. In this case, the image readers on the upper and lower sides are arranged so as to differ positions irradiated with light by the upper and lower light sources.

In addition, the image readers on the upper and lower sides are fixed at specific positions respectively; otherwise the image reader on the upper side is fixed at a specific position, while the other on the lower side is movable.

Moreover, the invention may comprise reading correction means for correcting the reading characteristics of the image readers on the upper and lower sides so as to be the same.

A fiber lens installed in the image reader comprises a light-absorbing layer around at least one of individual optical fibers of a specific length disposed in a specific shape and a fiber-bundle bundling a plurality of the optical fibers. The fiber lens may be manufactured by stuffing a specific shaped frame opening top and bottom ends with one of individual optical fibers and a fiber bundle bundling a plurality of the optical fibers around which a light-absorbing layer is formed, with a longitudinal direction of the optical fiber in the vertical direction and side by side in a diametrical direction of the optical fiber, and then solidifying an adhesive filling a gaps of the optical fibers.

The light source means of the invention is configured that a condensing lens in a specific shape and with a specific refractive index be attached to an irradiating surface of a belt-like light source, in order to uniform the illuminance over the specific width of the main-scanning and the sub-scanning directions for reading images on the original surface.

The shape of the condensing lens is preferable that a plane or a concave is placed at a position corresponding to the top of the curved surface of a cylinder of which cross sectional view is in D-shape.

BEST MODE FOR CARRYING OUT THE INVENTION

The invention is described according to FIGS. 1 to 14.

Figure 1:
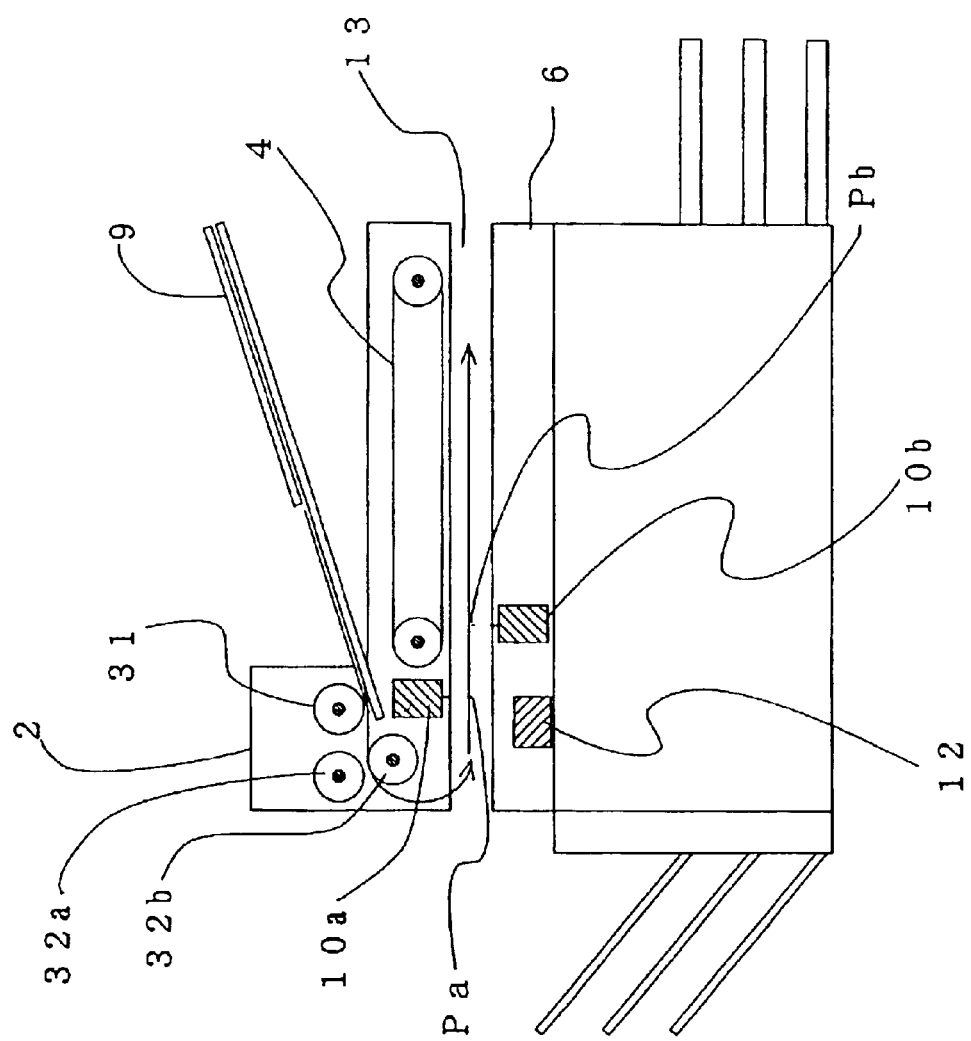
FIG. 1 is a block diagram of a copying machine of this invention performing the both-sides reading.

FIG. 1 shows a configuration of a copying machine employing an image reader of the present invention.

Like the related art, an original 9, which is fed into the inside of the copying machine by a picking roller 31 constituting an original carrier 2, is sent to a horizontal transport path 13 by upper and lower feeding rollers 32a and 32b. On the transport path 13, a belt roller 4 for receiving the original 9 from the feeding rollers 32a and 32b and sending it forwarder is placed. The belt roller 4 is controlled so as to start up when the tip of the original 9 reaches a specific position.

It is around the front end of the horizontal transport path 13 that two image readers 10a and 10b are provided above and below. The both sides of the original 9 are arranged to be read simultaneously at the upper and lower reading position Pa and Pb when the original 9 is carried through.

As above, in case of reading images on the both sides of the original 9, if it is arranged that the respective light source means installed in the upper and lower image reader 10a and 10b irradiate light on the same position of the upper and lower sides of the original, the irradiation light interferes mutually. In order to avoid such interference, the positions of respective image readers 10a and 10 are different so that each light source means in the image reader 10a and 10b may not irradiate light on the same position above and below.

In addition, the image reader 10a and 10b involve the reading characteristics such as γ-value (a ratio of density to sensor output) and the gradation characteristics; those exerting the influences on each of reading information obtained by reading images of the both sides of the original 9. Where images are printed on both sides of the paper provided by the copying machine, it is preferable to equalize the printing image quality of the one side to the one of the other side. In order to carry out this, it is necessary to agree the reading information of the upper image reader 10a with the one of the lower image reader 10b. Therefore, the copying machine is provided with reading correction means 12. Thereby it is arranged that each reading characteristics of the image readers 10a and 10b can be corrected and agree with each other.

Figure 8:
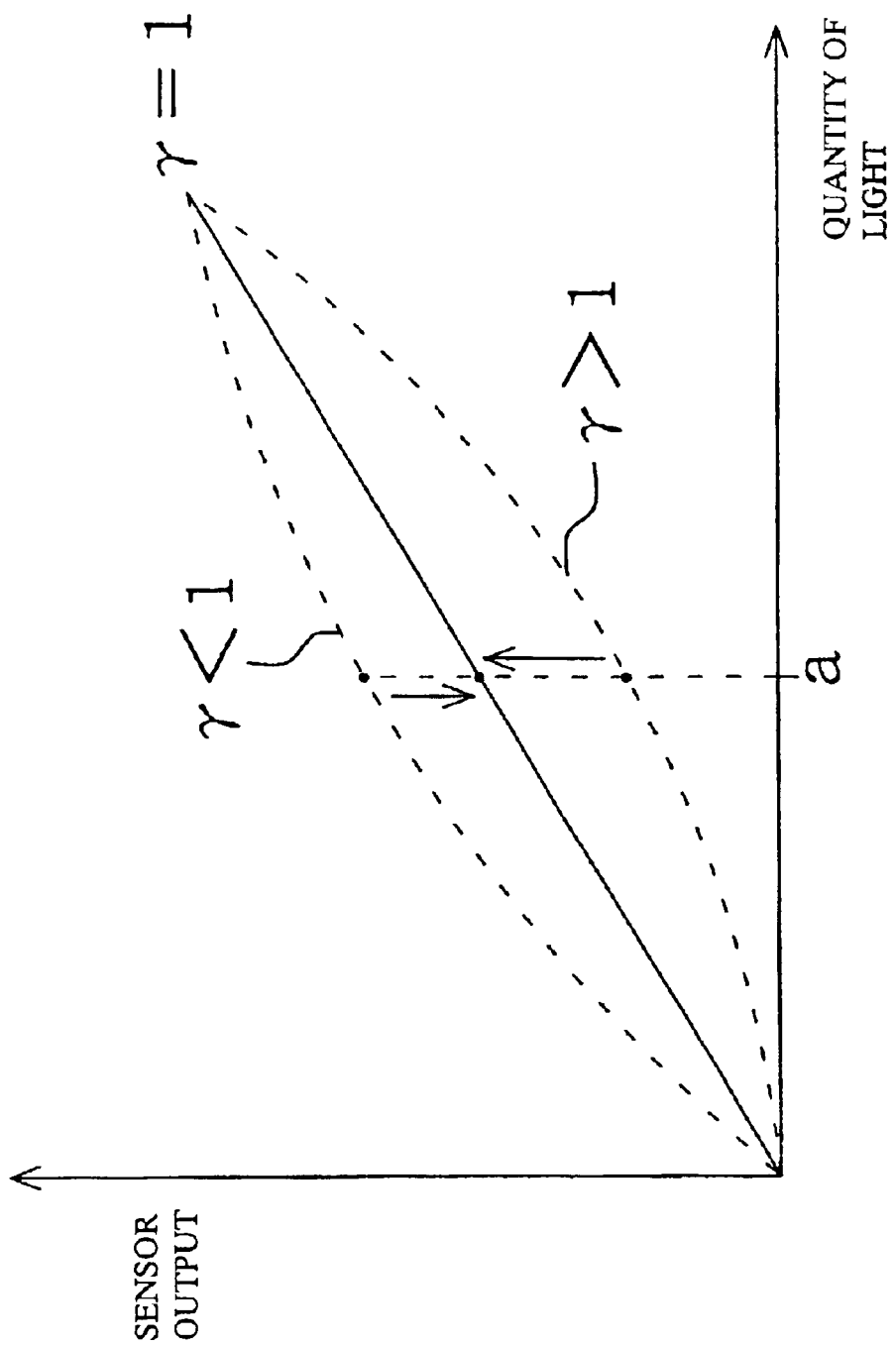
FIG. 8 is a diagram showing an example of the correcting on the basis of γ-value of the reading correction means of this invention.

For instance, regarding the above γ-value, the relation among the quantity of light (the total volume of light flux for a specific time) of the reflected light on the original 9, the output of a sensor 13 and the γ-value is expressed by graphs of γ>1, γ=1 and γ<1 as shown in FIG. 8. If the sensor output gets large at an arbitrary value a of quantity of light, the reading correction means 12 corrects the γ-value so as to be γ>1. Likewise, the reading correction means 12 corrects the γ-value so as to be γ=1 or γ<1, and then adjusts the values of the quantity of light and the sensor output. Thereby, the both of reading information of the upper and lower image readers become the same one.

Besides, it may be arranged regarding the upper and lower image reader 10a and 10b installed in the copying machine that the upper image reader 10a may be fixed, while the lower image reader 10b may be movable. The image reader may be movable adopting the fluorescent light and the mirror like the conventional machine.

In this case, the processing of reading images is performed as follows: first, the original 9 inserted in the original carrier 2 is carried to a reading station 6 by the picking roller 31 and the feeding rollers 32a and 32b.

Figure 15:
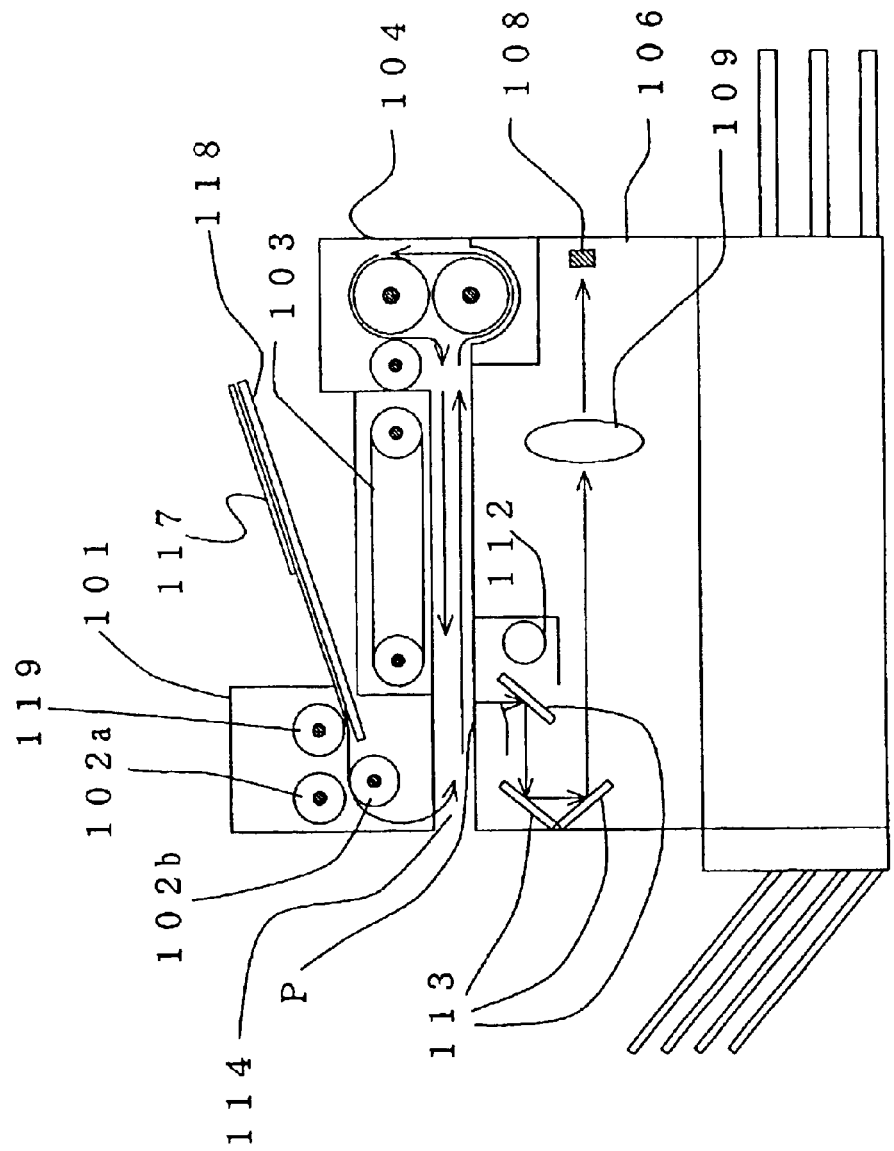
FIG. 15 is a block diagram of a conventional copying machine performing the both-sides reading.
Figure 16:
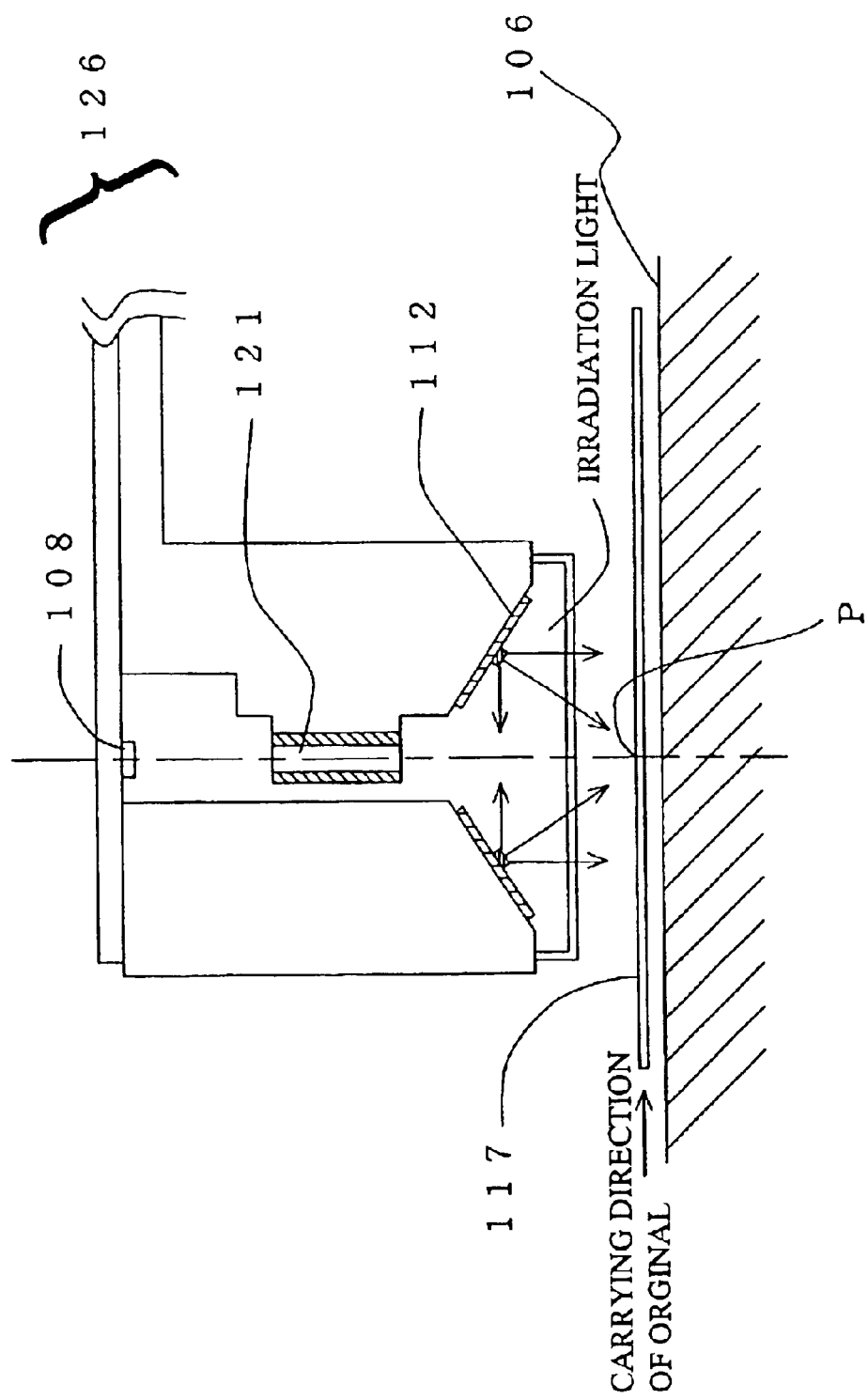
FIG. 16 is a block diagram of a conventional contact type of image reader.
Figure 17:
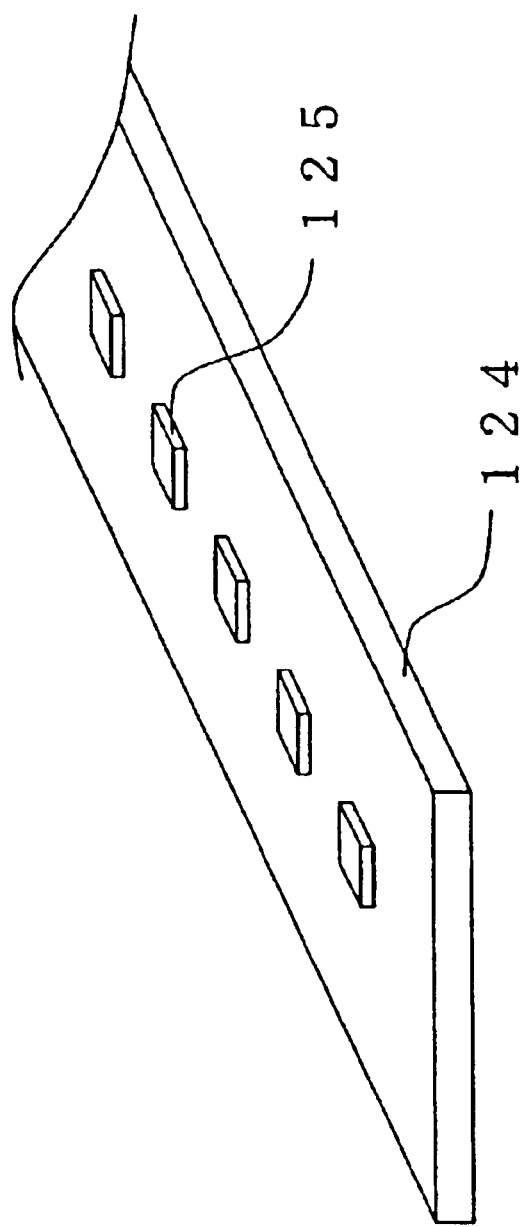
FIG. 17 is a perspective view of a light source of a conventional contact type of image reader.
Figure 18:
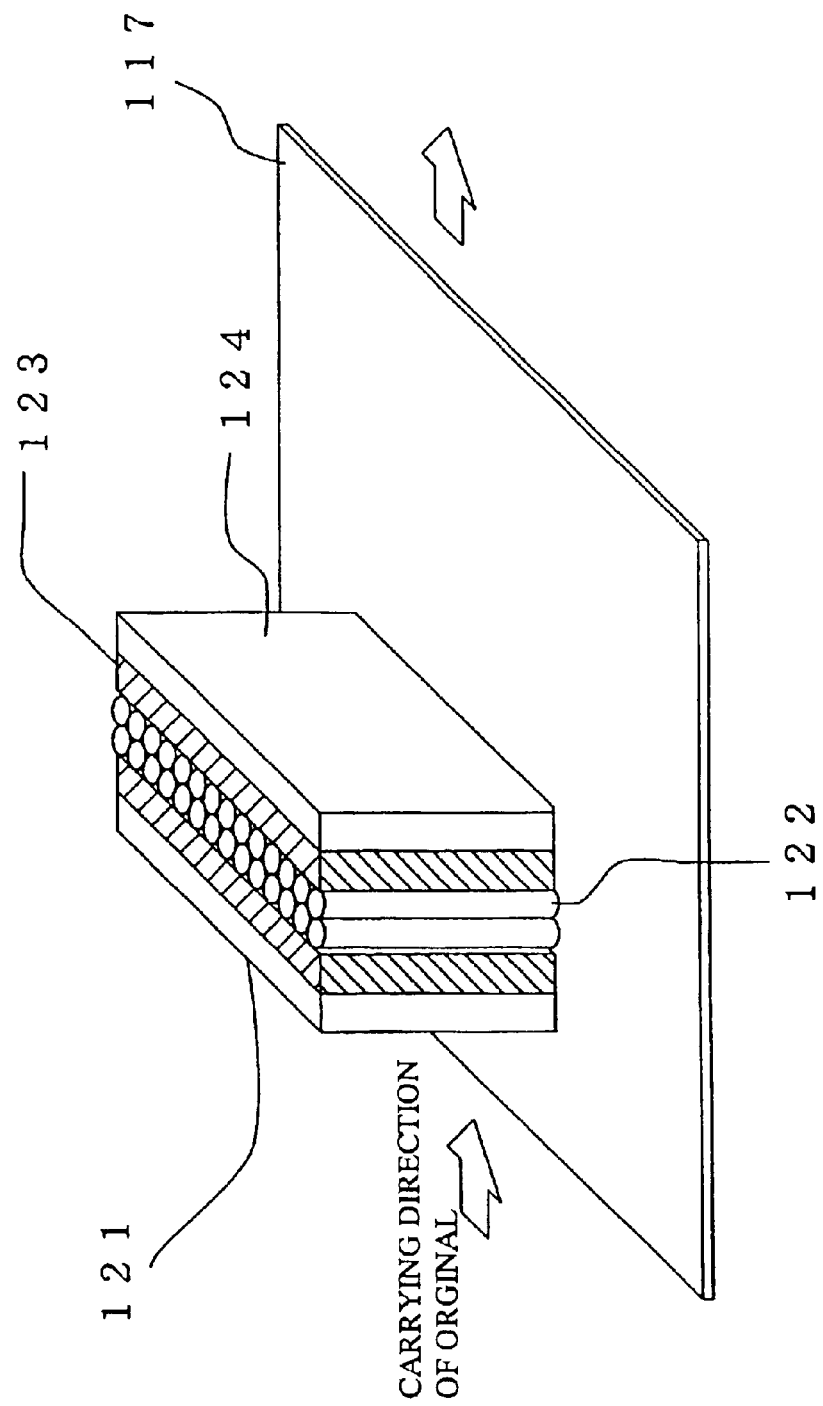
FIG. 18 is a perspective view of a rod lens array installed in a conventional contact type of image reader.
Figure 19:
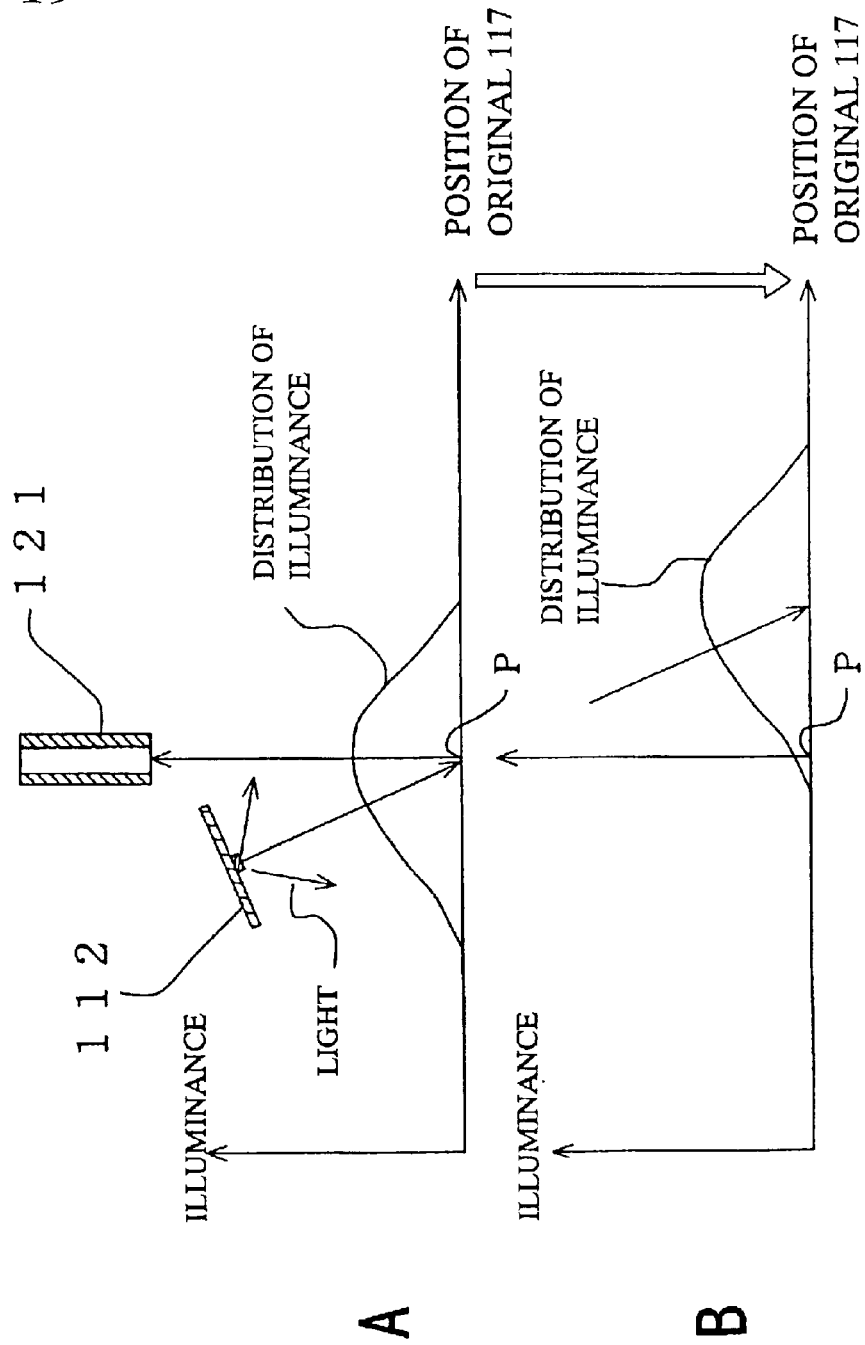
FIG. 19 is a graph showing the distribution of illuminance of a light source of a conventional contact type of image reader.

The original 9 is fed into the horizontal transport path 13 while being read by the fixed type of image reader 10a. On the lower side of the transport path 13 is a reading table (not shown in drawings) made of glass placed. When the original 9 is positioned on the reading table, the belt roller 4 stops temporarily and the fluorescent light of the light source (the reading position Pb as well as the light source) moves like the way illustrated in FIG. 15. After the image reader 10b completes the reading, the belt roller 4 starts and discharges the original 9 outside.

Where the lower image reader 10b is movable with the fluorescent light and the mirror like the conventional copying machine, the original 9 can be placed on the glass reading table. Thereby, the copying machine in the embodiment copes with the original that cannot be fed by the original carrier 2.

It is needless to say that, instead of moving the lower image reader 10b using the fluorescent light and the mirror as above, while the fluorescent light may be fixed at a specific position, the reading may be performed according to the original carried by the belt roller 4.

Figure 2:
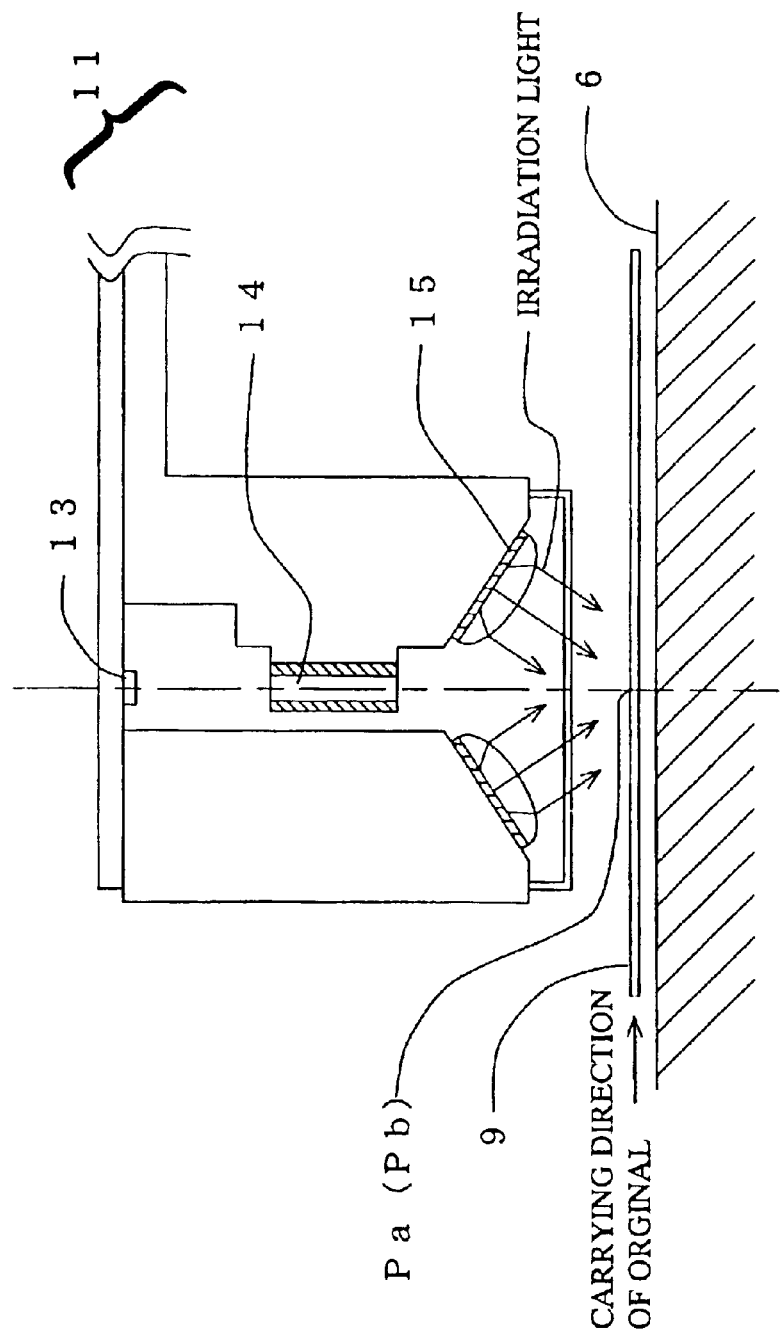
FIG. 2 is a block diagram of an image reader of this invention.

In addition, in order to avoid the big sizing of the copying machine and adopt the above configuration, the image reader must be downsized. Therefore, it is preferable that the image reader shown in FIG. 2 is adopted in order to restrain the optical path length as much as possible.

Specifically, the image reader comprises light receiving means 11a that is provided with lens 16 including a fiber lens 14 and the sensor 13, and light source means 15 irradiating light on the original 9.

Figure 3:
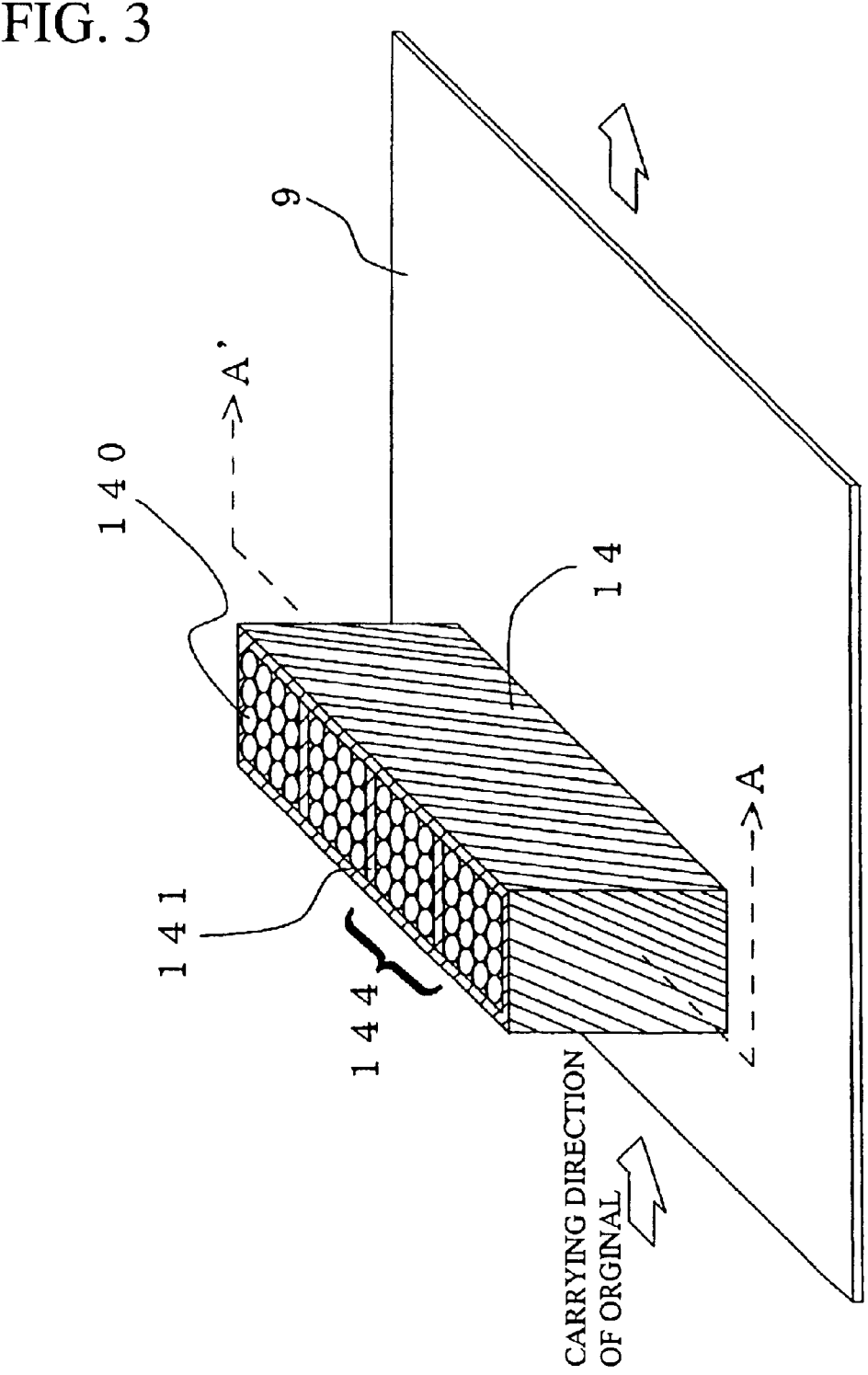
FIG. 3 is a perspective view of a fiber lens installed in an image reader of this invention.
Figure 5:
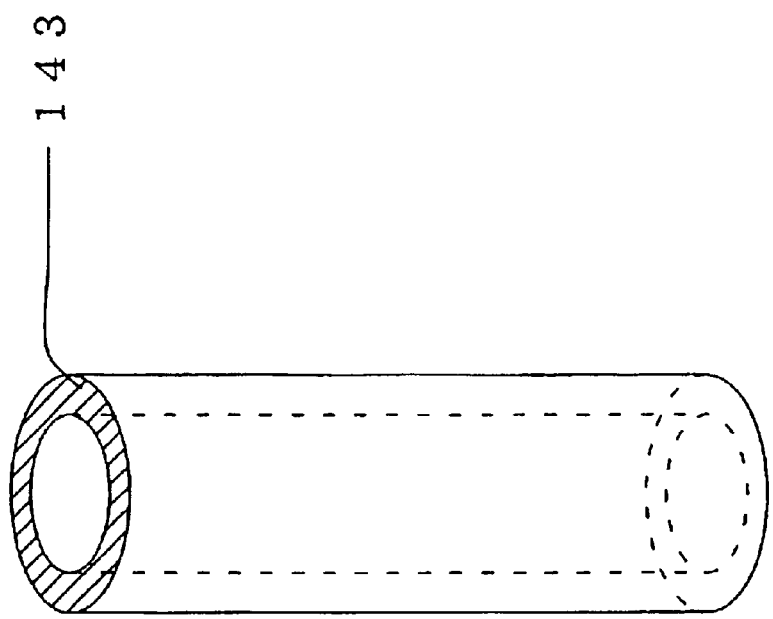
FIG. 5 is a perspective view of an optical fiber comprising the fiber lens of this invention.

Since it is necessary to shorten the focal length of the fiber lens 14 and deepen the focal depth of it, the fiber lens 14 must consist of the optical fiber 140 with a fine diameter, e.g. 0.5 mm and less as shown in FIG. 3. Thereby, it is possible to shorten the focal length and restrain the whole of the optical path length. On the contrary, the phenomena of the crosstalk and the flare become more and more conspicuous. Therefore, it may be arranged that a light-absorbing layer 143 be formed around individual optical fibers 140 of a specific length as shown in FIG. 5, or that a bundle of a plurality of optical fibers 140 of a specific length, around which the light-absorbing layer 141 is formed, makes a fiber-bundle 144 as shown in FIG. 3. It is note that the fiber-bundle 144 may include the optical fiber 140 around which the light-absorbing layer 143 is formed.

Figure 6:
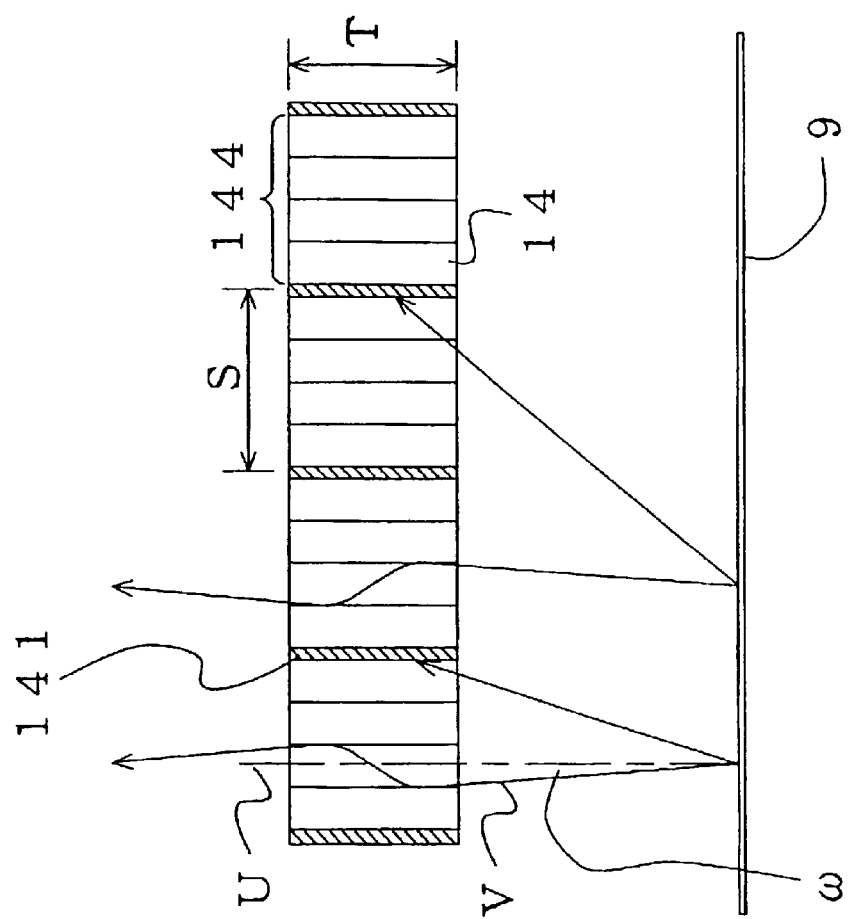
FIG. 6 is a sectional view taken along line A–A' of the fiber lens of this invention.

The fiber-bundle 144 is arranged to satisfy the following relation in order to prevent phenomena of the crosstalk and the flare. That is to say, as shown in FIG. 6, where one side length S of the fiber-bundle 144 is divided by the length T of the optical fiber 140, the value (S/T) is smaller than the tangent value (tan) of the angular aperture that is the angle between the central axis U of the optical fiber 140 and the incident light V. The one side length S, the length T and the angular aperture are determined so as to satisfy the above relation.

Figure 4:
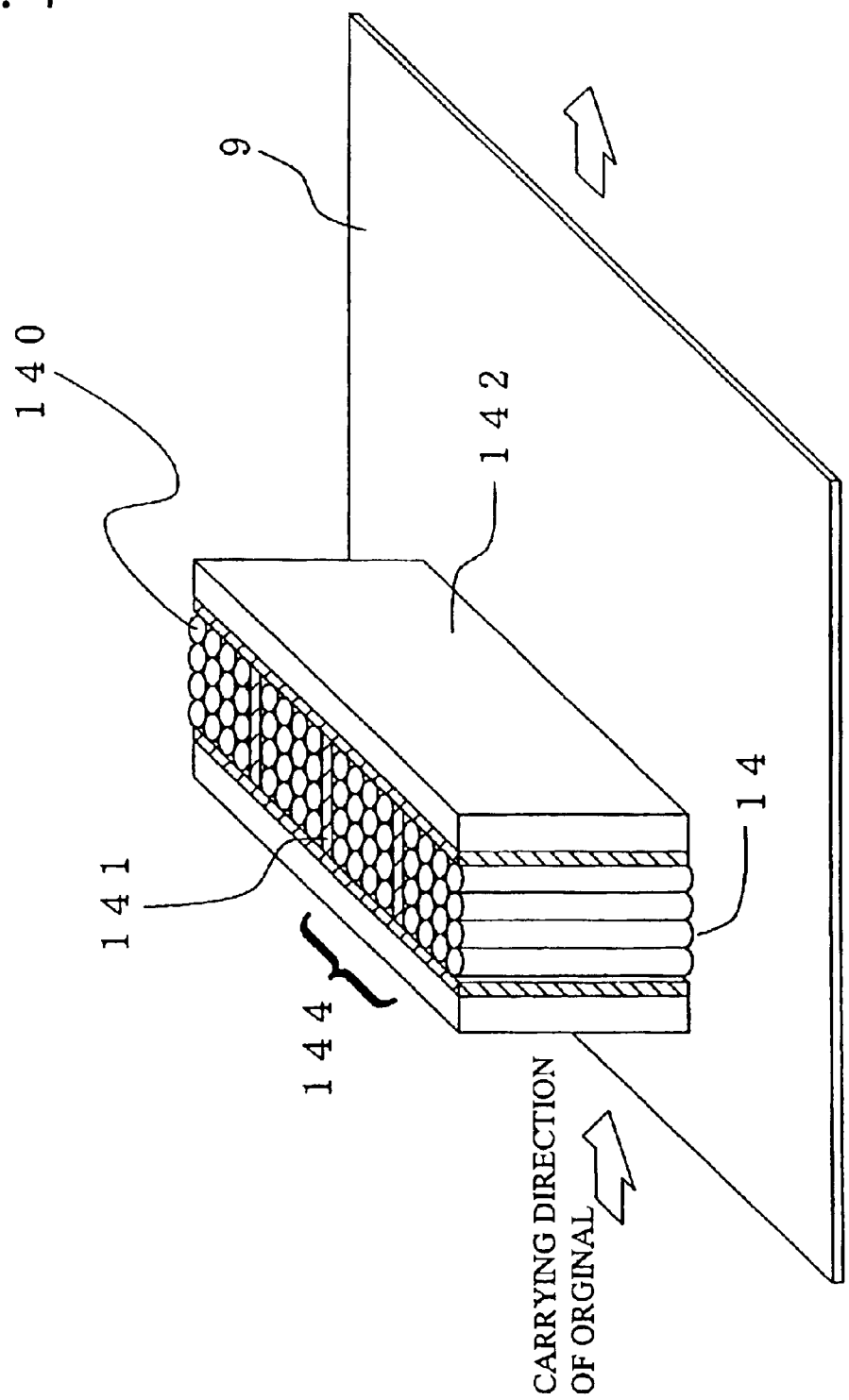
FIG. 4 is a perspective view of the other fiber lens installed in an image reader of this invention.

A plurality of optical fibers 140 around which the light-absorbing layer 143 is formed or a plurality of fiber-bundles 144 around which the light-absorbing layer 143 is formed are stuffed with a specific-shaped frame opening top and bottom sides, with a longitudinal direction of the optical fiber 140 in the vertical direction and side by side in a diametrical direction of the optical fiber 140. And the adhesive is filled in the gaps among respective optical fibers 140, which is solidified. After that, the frame is removed. The specific shape of the frame is the one required by the copying machine or the scanner adopting the fiber lens 14 to offer the primary functions, and it generally takes a belt-shape having the length right-angled to the direction of carrying the original. Moreover, if it is necessary for the shaping, after the individual optical fibers 140 or the fiber-bundles 144 are held within the frame by basal plates 142 made of the opaque glass or the resin as shown in FIG. 4, the basal plates 142 and the individual optical fibers 140 or the fiber bundles 144 may be bonded to each other according to the above-mentioned method.

In addition, there is the other method as follows (not shown in the drawings). A plurality of optical fibers 140 around which the light-absorbing layer 143 is formed or a plurality of fiber bundles 144 around which the light-absorbing layer 143 is formed are disposed close, with the longitudinal direction of the optical fibers 140 in the vertical direction and side by side in a diametrical direction of the optical fibers 140, and the adhesive is filled in the gaps among them. Moreover, they are put between basal plates 142 in a specific shape made of the opaque glass or the resin and the adhesive is solidified by the thermo-compression bonding. Besides, the specific shape of the substrate is the same one as illustrated in FIG. 3 or FIG. 4.

Figure 7:
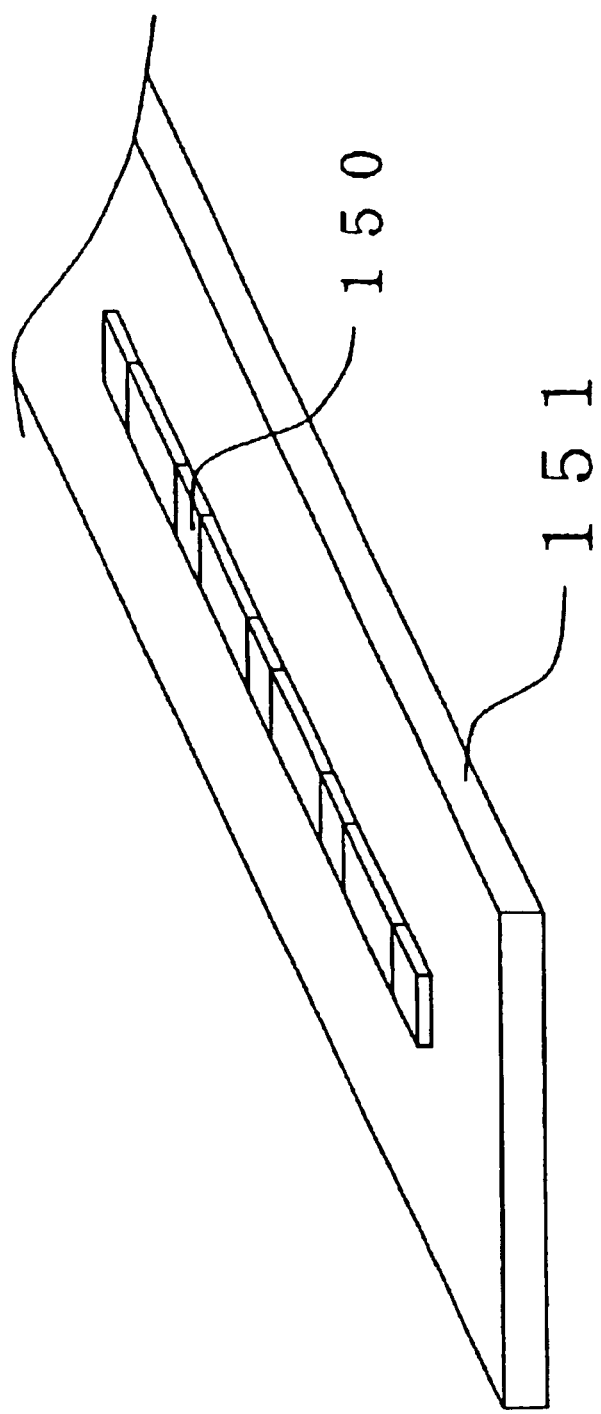
FIG. 7 is a perspective view of a light source installed in the image reader of this invention.

The light source means 15 may be configured so that LED 150 of LED element may be disposed close so as to be nearly in a belt shape, for example as shown in FIG. 7. Instead of the LED element, the configuration may be adopted so that the organic or inorganic electronic luminescence is formed almost in a belt shape.

The image reader 10a (the image reader 10b) is configured as the light source configured as above is disposed symmetrically in the upward (downward) direction diagonal to the reading position Pa (the reading position Pb), while the fiber lens 14 is placed on the upward (downward) of the reading position Pa (the reading position Pb).

Regarding the optical fiber 140, the refractive index gets smaller gradually in the right angles of the axis to the periphery (for example, get smaller according to the 2nd power of the increasing distance). Accordingly, even if there is no light-absorbing layer 141 and 143, the light is to be converged on the center in principle. Practically speaking, as the diameter gets small, the crosstalk and the flare phenomenon become more conspicuous. Therefore, the light-absorbing layer 141 and 143 are needed.

The light-absorbing layer 141 and 143 may be formed by coating, dipping, or evaporating black resin on. The adhesive 145, which is used for filling in the frame stuffed with the individual optical fibers 140 or the fiber-bundles 144, may be a conventional one, however it is preferable that the resin is in black so as to prevent the crosstalk or the flare phenomenon. The adhesive becomes the light-absorbing layer 141. In this case, in order to make the black adhesive play a role of the light-absorbing layer, the individual optical fibers 140 or the fiber-bundles 144, on the periphery of which the adhesive is formed in advance, is manufactured into the fiber lens 14 in the above-mentioned methods of using the frame in a specific shape opening the top and bottom ends, or of the thermo-compression bonding while holding with two basal plates 142. As a matter of course, under those manufacturing methods, the black adhesive should cover all over the periphery of the individual optical fibers 140 or the fiber-bundles 144. As the adhesive, the glass or the resin of which the softening point is low can be used, but the softening point must be lower than that of the materials of the optical fiber 140 and the basal plates 142 constituting the fiber lens 14.

By the way, where it is assumed that the optical fiber 140, which the fiber lens is provided with, be approximately 0.1 mm in diameter that is one-sixth of the diameter of the conventional rod lens, and be approximately 4.0 mm in length that is one-sixth of the length of the conventional rod lens, the image reader 10a and 10b becomes approximate 10 mm in thickness of the vertical direction to the surface of the original 9, which is one-sixth of that of the conventional contact type of image reader.

Moreover, if a sensitive sensor is adopted as the sensor 13, it is possible to shorten the reading time by improving the reading speed.

Besides, the operations of the copying machine other than the above description, for example, the operation that the image data read by the image reader 10a and 10b is printed on a paper included in the copying machine, the carrying operation of the papers, and etc., are like the prior art and not improved by this invention, so the explanation will not described here.

By adopting the fiber lens as described above, it is possible to shorten the optical path length to that extent, however, LED array or electronic luminescence must be adopted in order to downsize the device as described before. However, if the light source is like a fluorescent light, the light intensity is large and the illumination width is wide, while in case of LED array or electronic luminescence, the light intensity is small and the illumination width is narrow. Accordingly, as described in the beginning, there is a problem that it is not possible to obtain a sufficient image quality when the original shifts.

Figure 9:
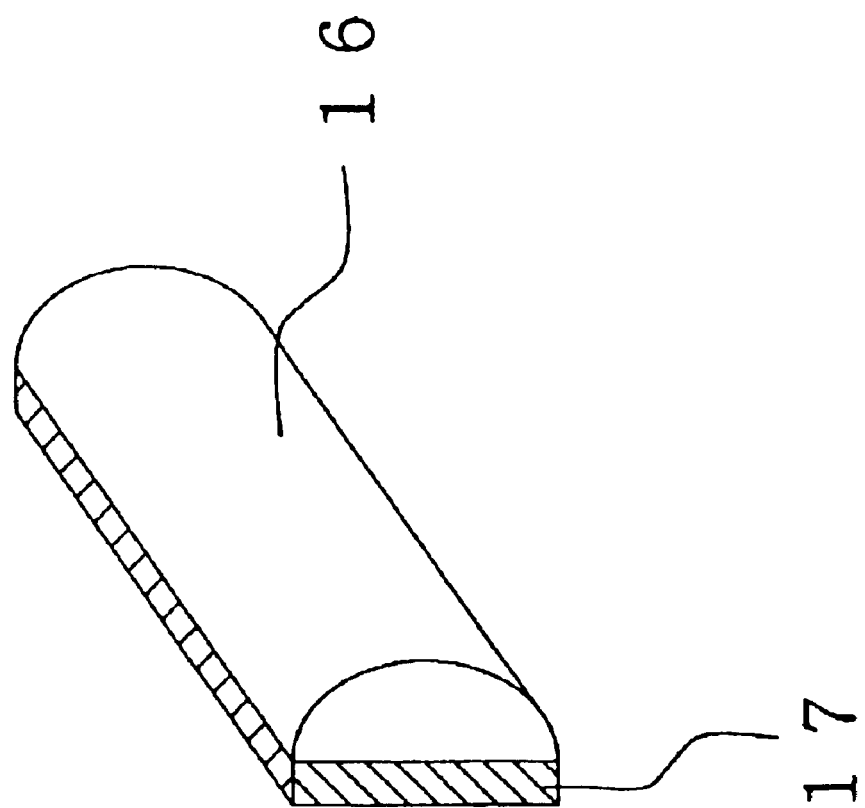
FIG. 9 is a perspective view of the light source means installed in the image reader of this invention.
Figure 10:
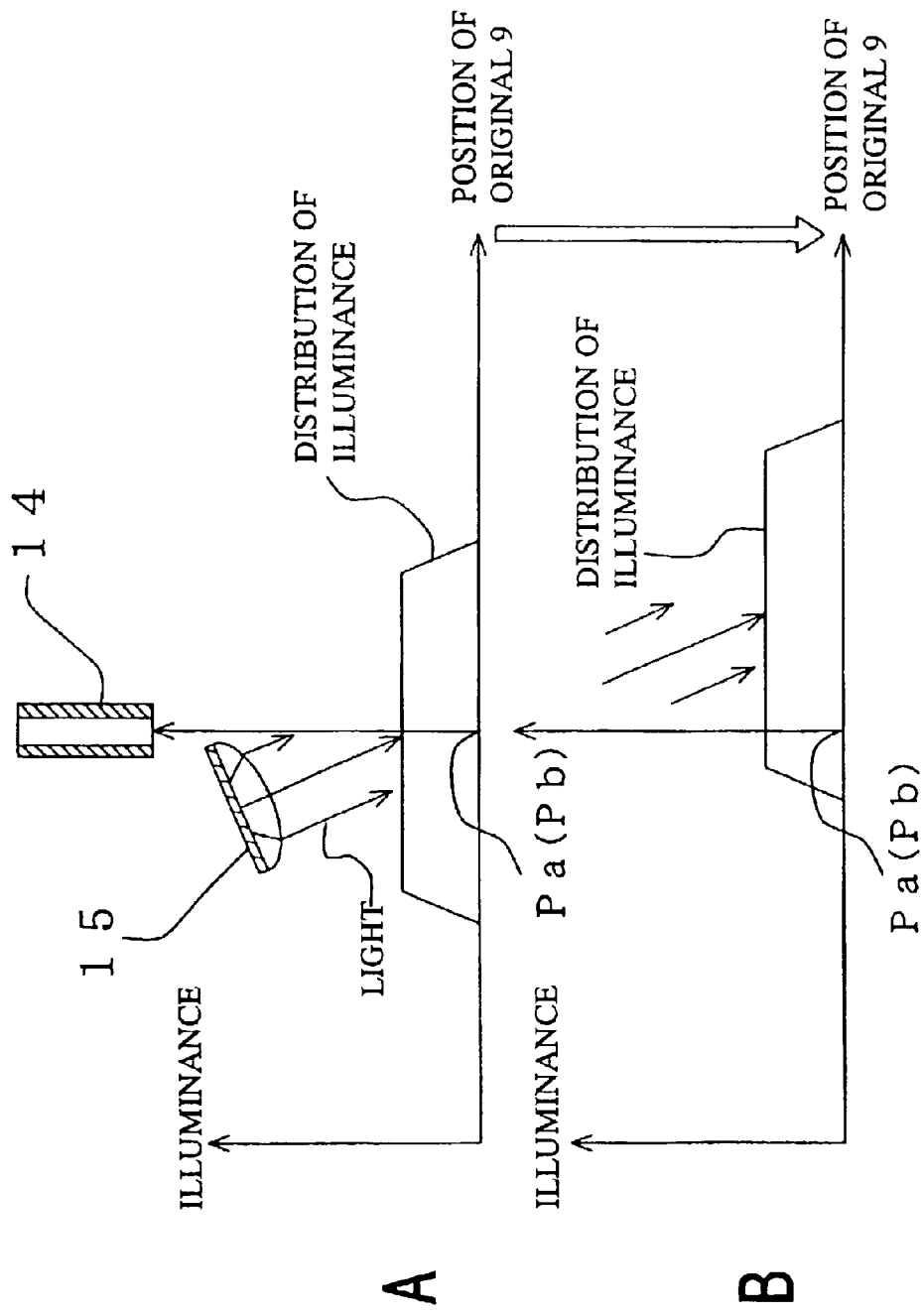
FIG. 10 is a graph showing the distribution of illuminance by the light source means installed in the image reader of this invention.

Therefore, the light source means 15 in the invention is configured as follows. That is to say, a slab lens 16 is pasted as a condensing lens on a light irradiation side of the belt-like light source 17 as shown in FIG. 9, thereby it is arranged a shown in FIG. 10A so that the illuminance be uniformed at the irradiation position in the main-scanning and sub-scanning directions on the original surface, particularly within a specific field of the sub-scanning direction.

Thereupon, even if the shift of the original can be seen in the direction away from the light source means 15, as far as the shift is within the specific field, it is possible to obtain the same illuminance as that of the reading position Pa (the reading position Pb, in case of the lower side) as shown in FIG. 10B. And the image quality is not deteriorated.

Figure 11:
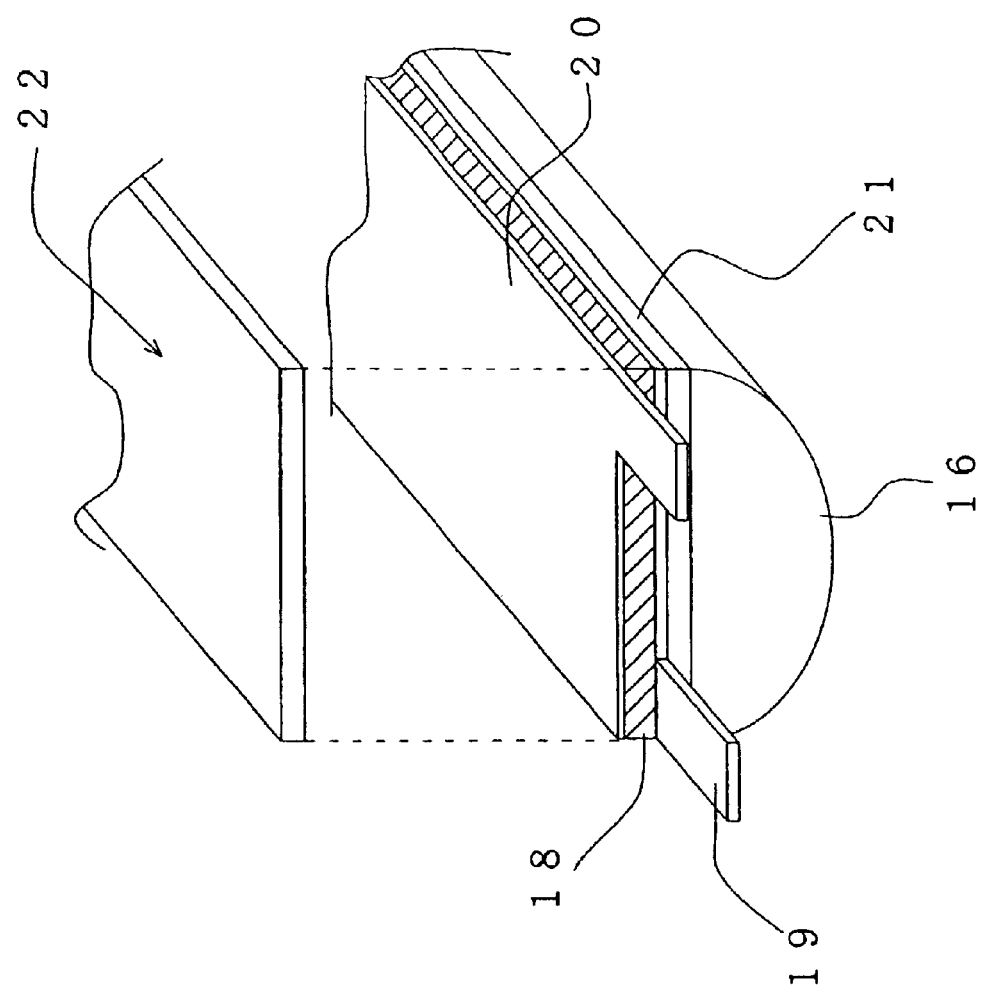
FIG. 11 is a perspective view showing a configuration of the light source means installed in the image reader of this invention.

FIG. 11 shows the configuration of the light source means 15 in which the electronic luminescence is used as a luminescent medium 18.

As shown in FIG. 11, the slab lens 16 is pasted on one side of the glass substrate 21. Meanwhile, the electronic luminescence material is evaporated or adhered to the other side of the glass substrate 21 putting ITO (tin oxide) electrode 19 between them, and a sealing substrate 22 is pasted on the other side of the electro luminescence material putting a metal electrode 20 (aluminum electrode, for example) between them. The shape and refractive index of the slab lens 16 are designed so as to uniform the illuminance in the specific field on the original as described above. Accordingly, those might be changed depending on the angle and the distance made between the surface of the original and the surface of the light source 17. The light source means 15 concerned with this configuration may be almost in a shape of a belt as a whole and disposed at right angles to the direction of carrying the original.

Figure 12:
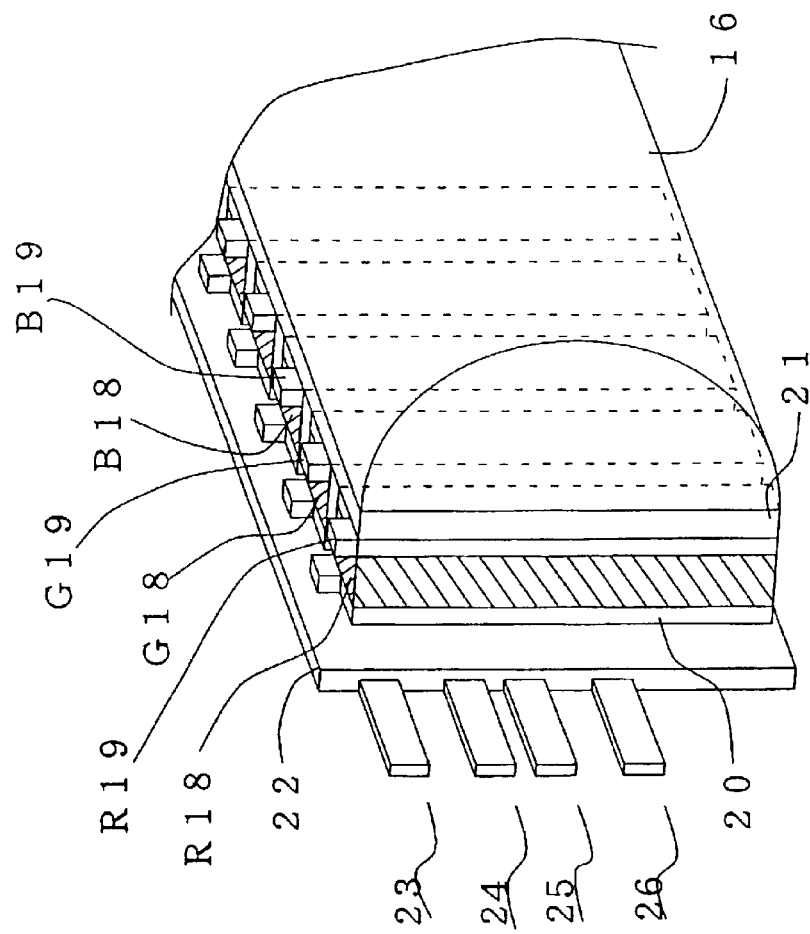
FIG. 12 is a perspective view showing a configuration for obtaining color light source by the light source means installed in the image reader of this invention.

FIG. 12 shows a configuration for obtaining the color light sources. Luminescence media R18, G18 and B18 corresponding to R(red), G(green) and B(blue) are disposed in order at specific intervals in lateral direction of the light source means 15, and close to each other so as to form nearly a belt-like shape as a whole. The ITO electrode 19 of the lens side is formed on each luminescence medium, while the metal electrode 20 of the sealing substrate 22 is formed as a common electrode.

For instance, in case where the ITO electrode 19 comprises the ITO electrode R19, G19 and B19 that are common to per each luminescence medium R18, G18 and B18 and the metal electrode 20 is the common electrode, the sealing substrate 22 is provided with a terminal 24 corresponding to the electrode R19, a terminal 25 to the electrode G19, a terminal 26 to the electrode B19, and a terminal 23 to the metal electrode 20 respectively.

Although it is conceivable the luminescence medium 18 should be LED array besides the organic or inorganic electronic luminescence as described above, even in this case, those must be disposed closely so as to be almost in a shape of a belt instead of disposing them per a single array at specific intervals like the prior art.

Figure 13:
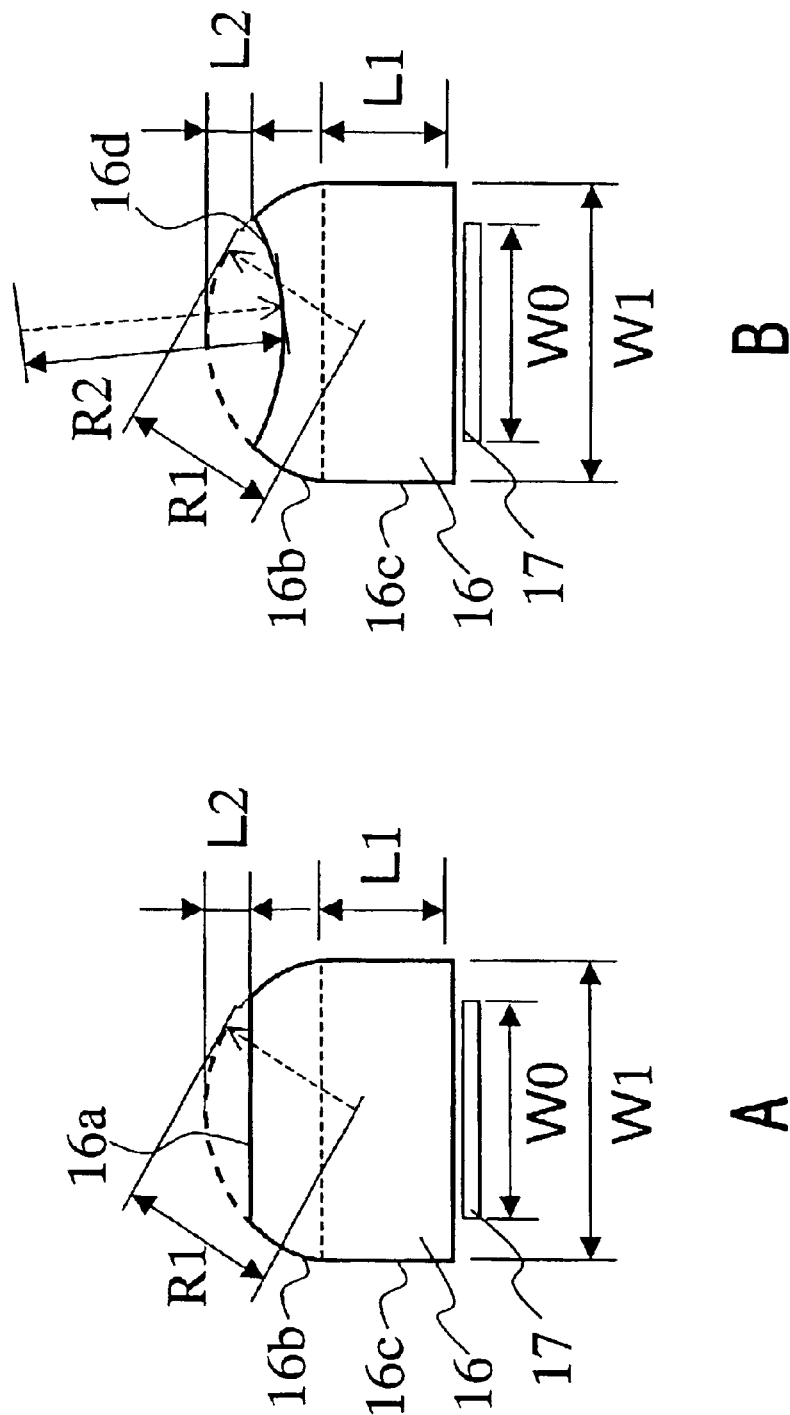
FIG. 13 is a diagram showing a concrete configuration of a condensing lens installed in the light receiving means of the image reader of this invention.

FIG. 13 shows a sectional view taken in the sub-scanning direction of the slab lens 16 formed in a preferable shape to uniform the refractive index.

The slab lens 16 shown in FIG. 13A is formed as a plane surface is placed on a position corresponding to a top of a curved surface of a cylinder, the sectional view of which is in D-shape. In FIG. 13A, the plane surface is expressed by a straight-line 16a, and provided at intervals of a distance 2L from the top of the curved surface. In FIG. 13, the curved surface represented as a circular arc 16b is a convex, and offers the working of the convex lens. On the whole, the convex plays a role of restraining the trapezoid-shaped distribution of illuminance shown in FIG. 10, and forming the upper base of the trapezoid-shaped distribution of illuminance by the plane surface between the convexes.

The width W1 of the slab lens 16 depends on the width W0 of the light source 17. This is because the light volume of the light source 17 leaked from the side of the height L1, which is represented as the straight-line 16c in FIG. 13, is subjected to the influence of the relation between the width W1 of the slab lens 16 and the width W0 of the light source 17. At least, it is preferable that the width W1 of the slab lens 16 is larger than the width W0 of the light source 17. The height L1 of the side of the slab lens exerts the influence on the magnitude of the illuminance corresponding to the height of the trapezoid. The more the height L1 increase, the more the illuminance increases and the narrower the distribution width of illuminance gets. On the contrary, the more the height L1 decreases, the more the illuminance decreases and the wider the distribution width of illuminance gets. In addition, a radius R1 of the circular arc 16b also exerts the influence upon the distribution of illuminance like the height L1. Therefore, according to the estimated shifting volume of the original and the required illuminance, the height L1 and the radius R1 are adjusted.

The slab lens 16 shown in FIG. 13B is formed as a concave surface is placed on a position corresponding to a top of a curved surface of a cylinder, the sectional view of which is in D-shape. This is different from previous one in the shape of surface at the position, but other parts is the same as the slab lens 16 shown in FIG. 13A. In FIG. 13B, the concave surface is expressed as a circular arc 16d. The concave surface among the convexes forms the upper base of the trapezoid-shaped distribution of illuminance like the plane surface. A radius R2 of the circular arc 16d also exerts the influence upon the distribution of illuminance.

Figure 14:
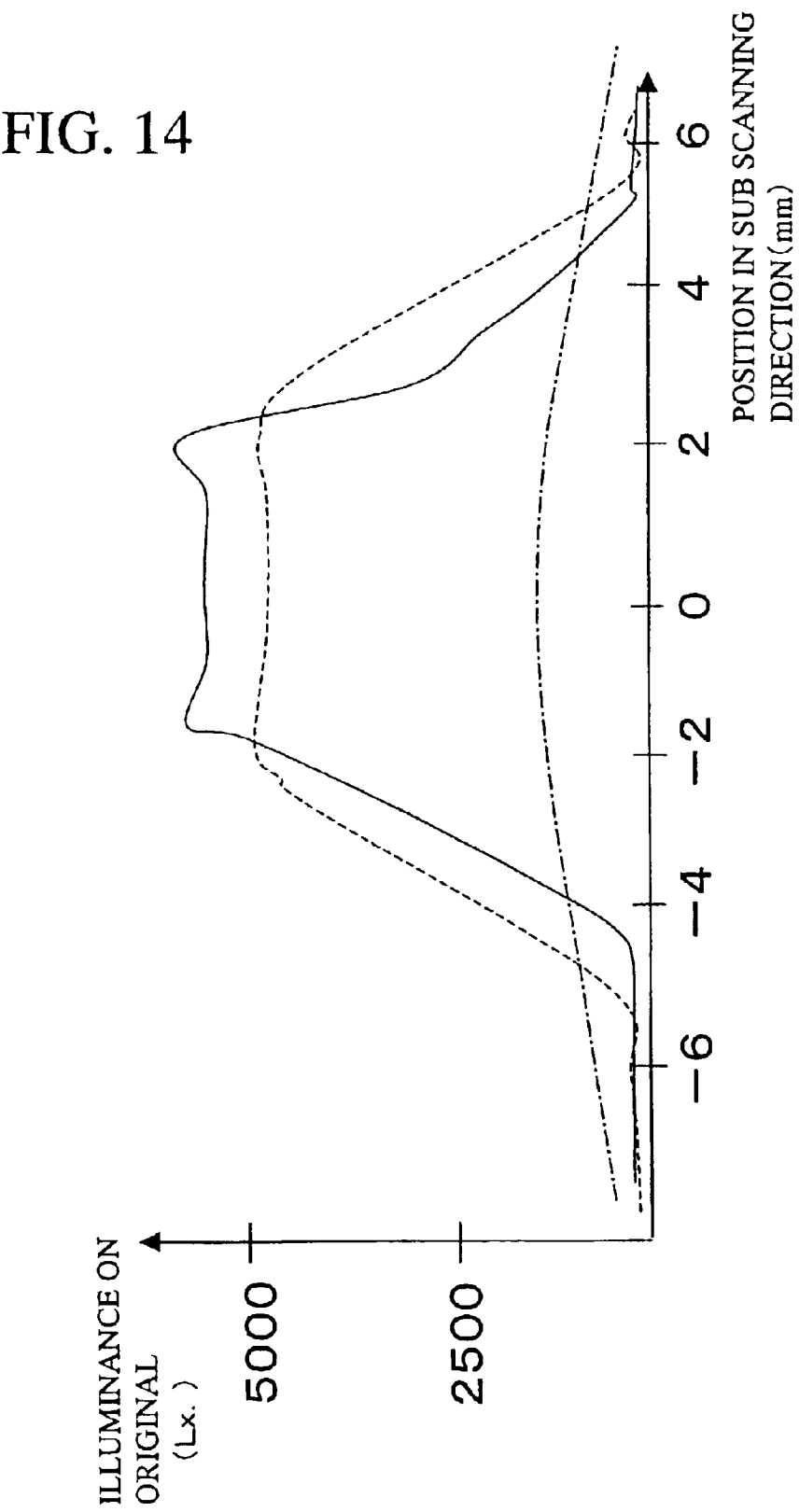
FIG. 14 is a graph showing the distribution of illuminance of the condensing lens shown in FIG. 13.

FIG. 14 shows a concrete example of the actual distribution of illuminance regarding the slab lens 16 shown in FIG. 13. In FIG. 14, the horizontal axis shows a position in the sub-scanning direction, while the vertical axis shows the illuminance on the original surface. The straight line expresses the distribution of illuminance of the slab lens 16 shown in FIG. 13A, and the dashed line expresses the distribution of illuminance of the slab lens 16 shown in FIG. 13B. In addition, the dot-and-dashed line expresses the distribution of illuminance in case of only the light source 17, which the above cases are compared with.

As it is evident according to FIG. 14, two slab lenses 16 shown in FIG. 13 carries out the distribution of illuminance shaped in trapezoid.

As mentioned above, if the slab lens 16 is formed, for example, in a shape of a series of a convex, a plane or a concave, and a convex in the direction of the sub-scanning direction, it is possible to carry out the distribution of illuminance in a shape of trapezoid. In result, it is possible to prevent the deterioration of the image quality when the original shifts.

According to such configuration, it is possible to obtain the uniformed illuminance within the specific field on the original 9 by using the electronic luminescence or LED with the relative small light intensity and the narrow illumination width. And it is also possible to ensure clear images against the shifting of the original 9.

Besides, though the above description refers to a case where the image reader of the invention is applied to the copying machine, the image reader can be applied also to the other devices such as a facsimile, a scanner, a multifunctional printer or the like. In addition, the image reader employing the above-mentioned slab lens 16 may be provided to either one side of the transport path instead of both the upper and lower sides.

INDUSTRIAL APPLICABILITY

As described above, the image processor of this invention is arranged that the image reader be provided to both the upper and lower sides of the transport path, so that it is possible to read at one time the images drawn on both sides of the original. Accordingly, the image processor needs not to be provided with the reversing roller and the like. And the image processor can be downsized and the reading speed can be improved. Therefore, the invention is available for the copying machine and the multifunctional printer that perform the both-sides reading.

In addition, when the image reader uses the fiber lens of the invention comprising optical fibers with fine diameter, it is possible to shorten the optical path length and deepen the focal depth. The whole size of the device can be smaller, and the image quality can be improved. Moreover, it is possible to use the light source with small consumption electric power.

Further more, in case of the light source means of the invention, that is to say, even in a case of the light source with small consumption electric power wherein the light intensity is small and the illumination width is narrow, the discrepancy of the original causes the deterioration of the image quality. Therefore, the light source means is suitable to a small-sized image processor.

What is claimed is:

1. An image reader comprising light source means for irradiating an original surface and light receiving means for receiving reflected light on the original, the light source means including:
   a belt-like light source; and
   a condensing lens attached to an irradiating surface of the light source, and the light source means forming trapezoid-shaped distribution of illuminance in a sub-scanning direction.

2. An image reader according to claim 1, wherein a maximum value in the trapezoid-shaped distribution of illuminance is more than a maximum value in a distribution of illuminance in case of using only the belt-like light source, and an upper base of the trapezoid-shaped distribution of illuminance has a width determined according to an expectable shifting amount of the original.

3. An image reader according to claim 1, wherein the condensing lens is in a shape of a series in the sub-scanning direction of a convex, one of a concave and a plane, and a convex.

4. An image reader according to claim 1, wherein the condensing lens has a shape of a D-section cylinder of which one of a plane and a concave is placed on a position corresponding to a top of a curved surface.

5. An image reader according to claim 1, wherein light sources are disposed symmetrically with respect to a reading position.

6. An image processor according to claim 1, wherein light sources are disposed symmetrically with respect to a reading position.

7. An image processor comprising an image reader having light source means for irradiating an original surface and light receiving means for receiving reflected light on the original, the light source means including:

a belt-like light source; and a condensing lens attached to an irradiating surface of the light source, and the light source means forming trapezoid-shaped distribution of illuminance in a sub-scanning direction.

8. An image processor according to claim 7, wherein contact type image readers are provided on upper and lower sides of a transport path for the original.

9. An image processor according to claim 7, wherein a maximum value in the trapezoid-shaped distribution of illuminance is more than a maximum value in a distribution of illuminance in case of using only the belt-like light source, and an upper base of the trapezoid-shaped distribution of illuminance has a width determined according to an expectable shifting amount of the original.

10. An image processor according to claim 7, wherein the condensing lens is in a shape of a series in the sub-scanning direction of a convex, one of a concave and a plane, and a convex.

11. An image processor according to claim 7, wherein the condensing lens has a shape of a D-section cylinder of which one of a plane and a concave is placed on a position corresponding to a top of a curved surface.

* * * * *